United States Patent [19]

Fraser et al.

[11] Patent Number: 5,168,608
[45] Date of Patent: Dec. 8, 1992

[54] APPARATUS FOR THE REPAIR OF TURBINE BLADES

[75] Inventors: Michael J. Fraser; Philip C. Franklan, both of Droitwich, England

[73] Assignee: Refurbished Turbine Components Limited, Droitwich, United Kingdom

[21] Appl. No.: 727,979

[22] Filed: Jul. 10, 1991

Related U.S. Application Data

[62] Division of Ser. No. 633,996, Dec. 26, 1990, Pat. No. 5,081,765.

[30] Foreign Application Priority Data

Jan. 10, 1990 [GB] United Kingdom ............... 9000580

[51] Int. Cl.⁵ .................. B23Q 3/06; B23C 9/00; B23B 39/12
[52] U.S. Cl. ................... 29/26 A; 408/98; 409/190; 409/215; 409/219
[58] Field of Search ........... 29/33 R, 889.1, 27 C, 29/26 R, 26 A; 409/163, 197, 190, 166, 143, 167, 202, 215, 204, 216, 219, 225; 408/95, 98, 97, 51

[56] References Cited

U.S. PATENT DOCUMENTS

| | | | |
|---|---|---|---|
| 3,823,645 | 7/1974 | Sukhov et al. | 409/202 |
| 3,884,122 | 5/1975 | Chernov et al. | 409/167 |
| 4,400,859 | 8/1983 | Woythal et al. | 29/27 C |
| 4,557,644 | 12/1985 | Scepanovic et al. | 409/143 |

FOREIGN PATENT DOCUMENTS

795708  1/1981  U.S.S.R. .................... 29/889.1

*Primary Examiner*—William Briggs
*Attorney, Agent, or Firm*—Armstrong & Kubovcik

[57] ABSTRACT

A method of and apparatus for forming a through bore or recess in a turbine blade, for a lacing wire hole for example, includes a machine capable of approaching the area to be machined in a first direction during which an initial machining operation may take place and them moving in a second direction completing the machining operation. Support means are provided to ensure the blade is held firmly. The method and apparatus permit of accurate machining of blades when they are in an array of blades still secured to the rotor.

15 Claims, 5 Drawing Sheets

APPARATUS FOR THE REPAIR OF TURBINE BLADES

This is a divisional of copending application Ser. No. 07/633,996 filed on Dec. 26, 1990, U.S. Pat. No. 5,081,765.

BACKGROUND OF THE INVENTION

1. Field of the Invention

The present invention relates to a method of and apparatus for the repair of turbine blades and is primarily concerned with repair of turbine blades in which the turbine blade assembly has a plurality of blades interconnected by means of connecting members, such connecting members may, for example, comprise lacing wires or cover bands. Such connecting members require a hole or other recess in the turbine blade to connect the connecting members to each blade.

The interconnecting members prevent excessive relative movement between the blades and dampen vibration during operation of the turbine.

The invention is primarily concerned with turbine blades provided with lacing wire holes, the lacing wires may be wires, rods, tubes or other members and will hereinafter be referred to, for the sake of convenience only, as lacing wires.

In use of the turbine the blades are subjected to wear and damage due to the adverse environment in which they have to operate. After a period of use, some repair work or renovation to the blades of the turbine becomes necessary.

It has been proposed by the applicants to carry out work on the turbine blades whilst the blades are still in place on the rotor. Such "in situ" repairs, providing they can be carried out satisfactorily considerably decreases the period in which the rotor has to be out of operation and, since the removal of the blades from the rotor is not only a time consuming and hence expensive operation, but also can lead to further damage being caused to the blades and/or rotor.

It has been found by the applicant, and is described in British patent specification 2091139, that where repair work has to be carried out in the vicinity of lacing wire holes, which repair work involves the input of considerable thermal energy and necessitates heat treatment after repair, an improved repair is provided by filling each lacing wire hole to eliminate the discontinuity in the blade afforded thereby.

Whereas such an operation can be carried out without difficulty when a blade has been removed from the rotor, and indeed in some cases it is not unduly difficult to fill the lacing wire holes even while the blade is on the rotor, the subsequent re-drilling of the lacing wire hole presents enormous problems. The lacing wire hole axis is generally at an angle considerably inclined to the surface of the blade, the blades in some rotors may have a considerable length and tend to move fairly easily when any pressure is applied thereto. It is essential that the lacing wire hole is drilled in the correct position, otherwise this would distort the lacing wires from their intended path which will have the effect in use of the turbine of applying a considerable strain to the blade resulting in an area of highly concentrated stress on that blade due to an out-of-alignment lacing wire hole.

SUMMARY OF THE INVENTION

It is an object of the present invention to provide an improved method of providing holes or through bores in turbine blades.

According to one aspect of the present invention, we provide a method of providing a through bore or recess in a turbine blade comprising the steps of:

(a) providing turbine blade support means;
(b) firmly holding the turbine blade in said support means;
(c) providing a machine having a rotating machining bit;
(d) moving the machine in a first direction towards the turbine blade until the machine bit is in a position where it is desired to form said through bore or recess;
(e) moving said machine in a second direction to form said through bore or recess.

Preferably movement of the machine bit in said first direction causes an initial machine operation on said blade. Conveniently said movement in said first direction machines a "flat" on said blade such that movement in said second direction causes the machine bit to contact a surface part and is substantially normal to said second direction.

Preferably said first and second directions are substantially at right angles to each other and said second direction co-axial with an axis of a hole to be drilled in the turbine blade or accords with the direction of depth of a recess to be formed therein.

It is another object of the present invention to provide apparatus to enable the formation of a lacing wire hole in a turbine blade that overcomes the above mentioned problems.

According to another aspect of the present invention, we provide apparatus adapted to form a through bore or recess in a turbine blade, said apparatus comprising blade support apparatus adapted to support a turbine blade and machining apparatus comprising a machine head having a machine bit mounted for rotary movement, said machine head being movable in a first direction to enable the machine bit to be brought into a predetermined machining position relative to the blade to be machined and also being movable in a second direction different from said first direction to enable the machine bit to be brought into contact with the blade and to enable a machining operation to be carried out to form said through bore or recess.

Preferably said machining apparatus and said support apparatus are provided with a base member or are adapted for mounting on a base member and conveniently said support apparatus is provided with movement means enabling movement of a part or parts adapted to support the blade relative to said base member.

Preferably movement in said first direction is generally in a direction parallel to the axis of revolution of the rotor on which said turbine blade is secured. Preferably movement in said second direction is substantially tangential to said axis of revolution.

Alternatively said first direction may be substantially radially of said axis of revolution such that said machining apparatus is moved towards the turbine blade to be machined in a direction from the outer end of the turbine blade, said second direction remaining substantially tangential to the axis of revolution.

Preferably said support apparatus comprises a first support part adapted to abut one face of a turbine blade and conveniently is adapted to abut a rear face, i.e. the face directed away from fluid flow during use of the turbine, a second part may be adapted to engage the leading edge of the turbine blade and a third part adapted to engage the trailing edge of the turbine blade.

Said support part may further include a fourth part adapted to engage the end of the turbine blade or alternatively a part adapted to engage the end of the turbine blade may be provided separately from said support apparatus but may be provided with means for engagement with a base member on which the support apparatus and the machining apparatus are adapted to be secured.

Means may be provided to adjust movement of any of said first, second, third and fourth parts whereby said support apparatus may be adapted to firmly clamp a turbine blade in a predetermined desired position.

Said support apparatus may be provided with second movement means permitting of adjustment of said support apparatus in a direction substantially radially of the axis of revolution of the rotor.

Said support apparatus may comprise means to engage an adjacent blade in an array to bend, within an elastic limit, said blade to assist in making room for access of said machining apparatus to the blade requiring machining.

Preferably said machining apparatus comprises a machine head mounting part which is provided with movement means to enable said mounting part to be moved in said first direction to bring the machine head to a correct machining position.

Said machine head may be movably mounted in said mounting part to enable movement of said machine head in said second direction and means may be provided on said mounting part to enable manual operation of said movement in said first direction.

Preferably said machine head is provided with a milling cutter or a multi-fluted drill.

A milling cutter has considerable advantages in the apparatus of the present invention since not having a point it is not only shorter and therefore access to the machining area is easier but it does not suffer from the disadvantage of skidding when cutting into a surface that is not substantially at right angles to the cutter, as is the case when the blade is machined thus leading to a more accurately positioned and machined aperture or recess.

Conveniently further blade engagement means are provided which may be mounted on the mounting part of the machining apparatus, said blade engagement means being adapted to engage the face of the blade adapted to be machined. Conveniently the opposite face to that engaged by the first part of said support apparatus, and wherein said blade engagement means is provided with an aperture, through bore or cut-out enabling the machine bit to pass through said further part to enable machining of the blade during movement of the machine bit in its second direction.

Preferably where said further blade engaging part is provided on the support part of said machine head, it is mounted in a manner permitting removal thereof so that if preferred it may be removed.

It has been found that much greater accuracy in the positioning, for example, lacing wire holes can be achieved by the method of the present invention since in view of the complex shape of turbine blades the drilling of a hole at an angle which is substantially inclined to the surface of a blade may cause undesired deflection of the drill bit from its intended path.

Whereas the apparatus and the method of the present invention is primarily intended for the re-forming of lacing wire holes or other recesses prior to the reforming of a lacing wire hole which had subsequently been filled with weld material, for example, so that a satisfactory repair process could be carried out, it is first necessary to remove existing lacing wire from the original lacing wire holes in the blade.

Such an operation can sometimes be time consuming and unless carefully carried out may cause damage to the blade and whereas in the past, particularly when blades have been separated from a rotor, it was not unknown to cut the lacing wires between blades and subsequently remove the lacing wire stub from the blade by for example debrazing if the lacing wire was brazed to the blade and by hammering out or otherwise removing the stub from the aperture.

This can be a very difficult operation and if the stub cannot easily be removed it is quite often that damage is caused to the blade during the process of removal of the stub from the blade.

It has been found that the apparatus of the present invention enables removal of lacing wires while the blade is still in position on the rotor.

According to another aspect of the invention we provide a method of removing a lacing wire from a turbine blade comprising severing the lacing wire between adjacent blades at a position proximate to the blade from which the lacing wire is to be removed, moving a machining apparatus in a first direction towards the lacing wire and continuing said movement to cause removal of a part of the lacing wire and subsequently moving said machining apparatus in a second direction in an axis substantially coaxial with the lacing wire axis and continuing said movement until said lacing wire is removed.

Preferably said first and second directions are substantially at right angles to each other.

Conveniently the turbine blade to which the lacing wire is secured is supported by, for example, support apparatus as aforedescribed during said machining operation to ensure correct positioning of the machining apparatus relative to the lacing wire and preventing untoward movement of the turbine blade.

The apparatus and methods of the present invention enable replacement or modification of lacing wire holes and hence lacing wires so that, for example, the rotor may be made more efficient in design since the apparatus and methods of use of the apparatus enable the removal of existing lacing wires, the original lacing wire hole may then be filled and a new hole cut, either in the same position or a different position and either of the same or a different size to accommodate, for example, a different shape or type of lacing wire.

Certainly no such operations have been possible on a turbine blade while still in situ on a rotor.

The dual movement of the machining apparatus enables the formation of a flat surface which the mill or drill may engage prior to movement in the second direction which ensures that the drill bit is not deflected from its correct path.

BRIEF DESCRIPTION OF THE DRAWINGS

The apparatus and methods of the present invention will now be described in more details by way of example only with reference to the accompanying drawings, wherein.

DESCRIPTION OF THE PREFERRED EMBODIMENTS

Figure 1:
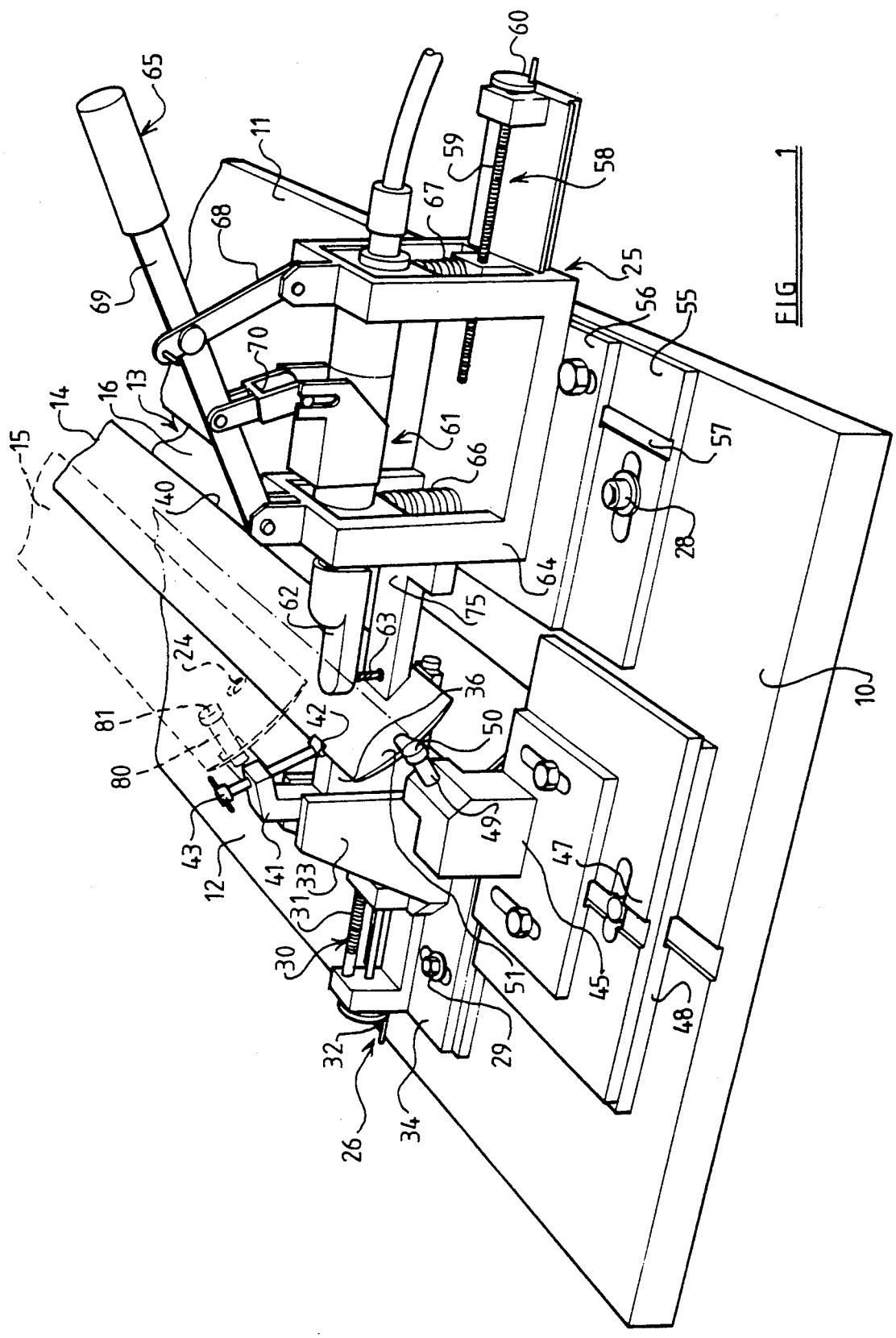
FIG. 1 is a perspective view of one embodiment of apparatus of the present invention.

Referring first to FIG. 1, the apparatus of the present invention is shown mounted on a base plate 10. The base plate 10 is U-shaped having a first limb 11 and a second limb 12 between which extends a gap 13 allowing for the passage of the end parts of turbine blades, such as those shown at 14, 15 and 16.

Figure 2:
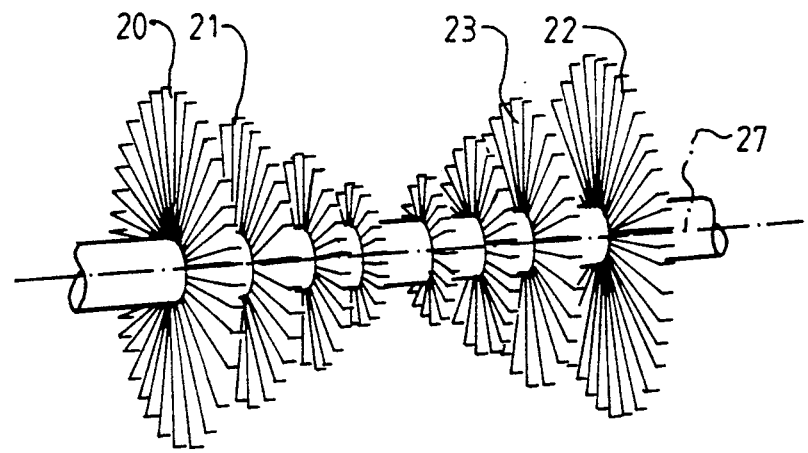
FIG. 2 is a view of a turbine rotor.

FIG. 2 illustrates one example of a turbine rotor and in a typical array there may be, for example, sixty or seventy blades.

At the low pressure end of the turbine, for example the turbine blades generally indicated at 20, 21, 22 and 23, it is likely that the blades in the array will be tied together by lacing wires which pass through holes such as the hole illustrated at 24 in FIG. 1 and the lacing wires may be secured to each blade, for example by brazing.

Once the lacing wires have been removed from the blades, the holes such as hole 24 may be filled with weld material so that further repairs may be carried out to the blades such as, for example, securing a new shield on the leading edge thereof to prevent erosion or repairing other damage after which each blade is subjected to a heat treatment process to relieve stress in the blade and then it is necessary to re-form the lacing wire hole 24 in the correct position.

The apparatus shown attached to the base plate 10 comprises machining apparatus generally indicated at 25 and support apparatus generally indicated at 26.

The slot 13 in the U-shaped base plate 10 will extend radially of the rotor axis 27 and both the machining apparatus 25 and the support apparatus 26 will be located firmly relative to the base plate 10, for example by bolts shown at 28 and 29 respectively. Both the machining apparatus 25 and the support apparatus 26 may be secured so that at least radially compared with axis 27 they are both in the correct position to enable the correct position of the lacing wire holes 24.

If required means may be provided on both the support apparatus 26 and the machining apparatus 25 to provide fine radial adjustment by means of a movement system and fine threaded screw engagement for example.

In order to drill a new lacing wire hole in the blade, firstly a blade, for example the blade 14, is brought into the correct position relative to the machining apparatus 25, the support apparatus 26 is then moved by means of a movement system generally indicated at 30 and comprising a threaded member 31 and operating wheel 32, operation of the wheel 32 causing movement of the support member 33 relative to the sub-base plate 34. Movement is continued towards the blade until a first support part 36, which can also be seen in FIG. 3, engages the underside 37 of the blade 14.

A second support part 38 may then be secured by securing means 39 so that it abuts the leading edge 40 of blade 14 and firmly locates the blade 14.

A third support part 41 comprises an engagement part 42 and an adjustment member 43. The engagement part 42 may then be moved towards the blade 14 until it firmly clamps the trailing edge 44 of the blade 14.

The blade 14 is firmly secured by the support apparatus 26 so that movement, at least at the outer end thereof, relative to the base plate 10 is not possible.

The support apparatus shows a further support member 45 which is provided on a sub-base plate 46 and is movable via guide members 47 and 48 relative to the base plate 10. A locating pin 49 is provided and a clamping part 50.

The further support member 45 is carefully adjusted until the support pin 49 is accurately located on the underside 37 of the blade 14 and then the clamping member 50 is secured thereto by securing means such as a bolt or machine screw (not shown) so that the end of the blade 14 is firmly clamped between pin 49 and clamping member 50.

The machining apparatus is secured by sub-base plates 55 and 56 and guide means, one of which is shown at 57, to the base plate 10 and is movable by a fine movement means 58 comprising a threaded member 59 and operating wheels 60 so that the machining apparatus 25 may be moved in a direction substantially parallel with rotor axis 27 into and out of engagement with a blade to be machined.

The machining apparatus comprises, in the embodiment illustrated, a pneumatically operated rotary machine 61 having a machine head 62 and a rotary machine bit 63.

The machine 61 is mounted for limited vertical movement in a stand 64, vertical movement being enabled by operation of operating bar 69 having a handle 65 in a downwards direction which movment is resiliently resisted by springs 66 and 67.

In order to move the machine head 62 in a downwards direction, the safety catch 68 is first removed from engagement with the operating bar 69, the handle 65 is moved in a downwards direction causing clockwise pivotal movement of operating bar 69 and vertical downwards movement of the machine 61 through connection with connecting member 70.

Once the blade 14 has been properly clamped by the support means 26, the operating wheel 60 of the machining apparatus may be rotated and the machine head 62 moved so that the cutting bit 63 will be brought into contact with a surface of the blade 14.

When in the cutting position, the machine apparatus may then be moved downwards by downwards movement of the handle 65 which will cause the rotating machine bit 63 to cut a hole in the blade 14.

Since the axis of the hole to be cut in the blade 14 is inclined at an acute angle to the plane of the surface of the blade, it has been found that a multi-flute milling cutter 63 minimises the risk of any skidding of the bit on the blade surface and hence ensures absolute accuracy.

In some cases the room to manoeuvre the machining apparatus between adjacent blades may be limited and the further support member 75 may be removed after perhaps an initial machining operation has been carried out on the blade.

The support apparatus 26 is also provided with a deflection member in the form of a bolt 80. The bolt 80 is threadedly engaged with the support apparatus and may be rotated until the head 81 abuts the adjacent blade 15 further rotation causing resilient deflection of the blade 15 away from the blade 14 and enabling access to the blade 14 by the machining apparatus 25.

The method of removing lacing wire parts from each blade will now be described in more detail with reference to FIGS. 4 to 8.

Figure 4:
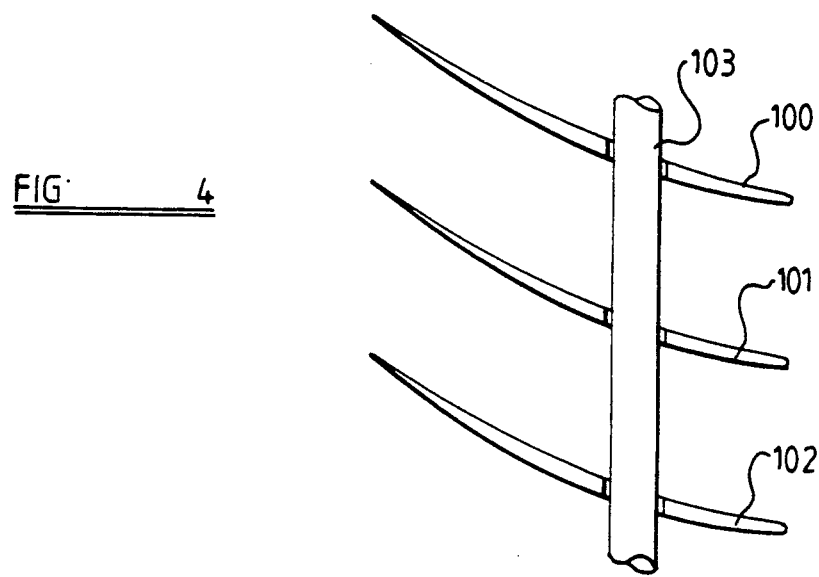
FIG. 4 illustrates three blades tied by a lacing wire.

FIG. 4 illustrates three blades 100, 101 and 102 interconnected by a lacing wire 103.

Figure 5:
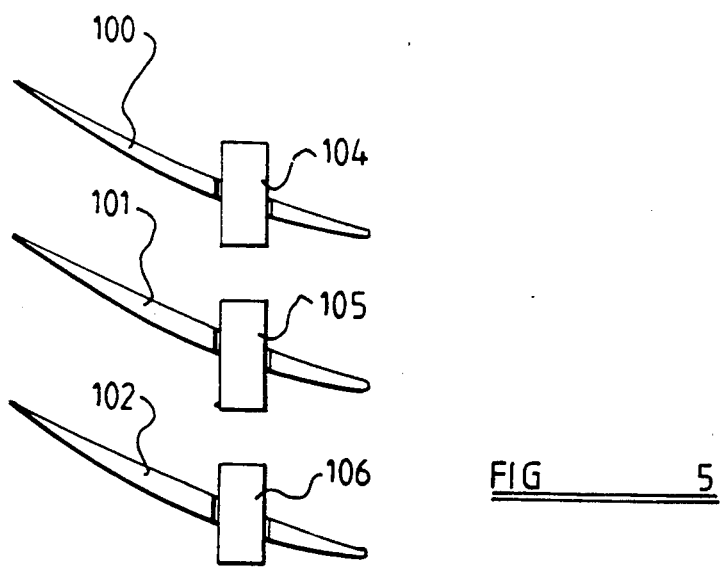
FIGS. 5, 6, 7 and 8 illustrate the sequence of events to remove the lacing wire stub from the blade.

The lacing wire 103 is cut between the blades 100, 101, 102 so that only a stub like portion, as shown at 104, 105 and 106 in FIG. 5 remains.

Figure 3:
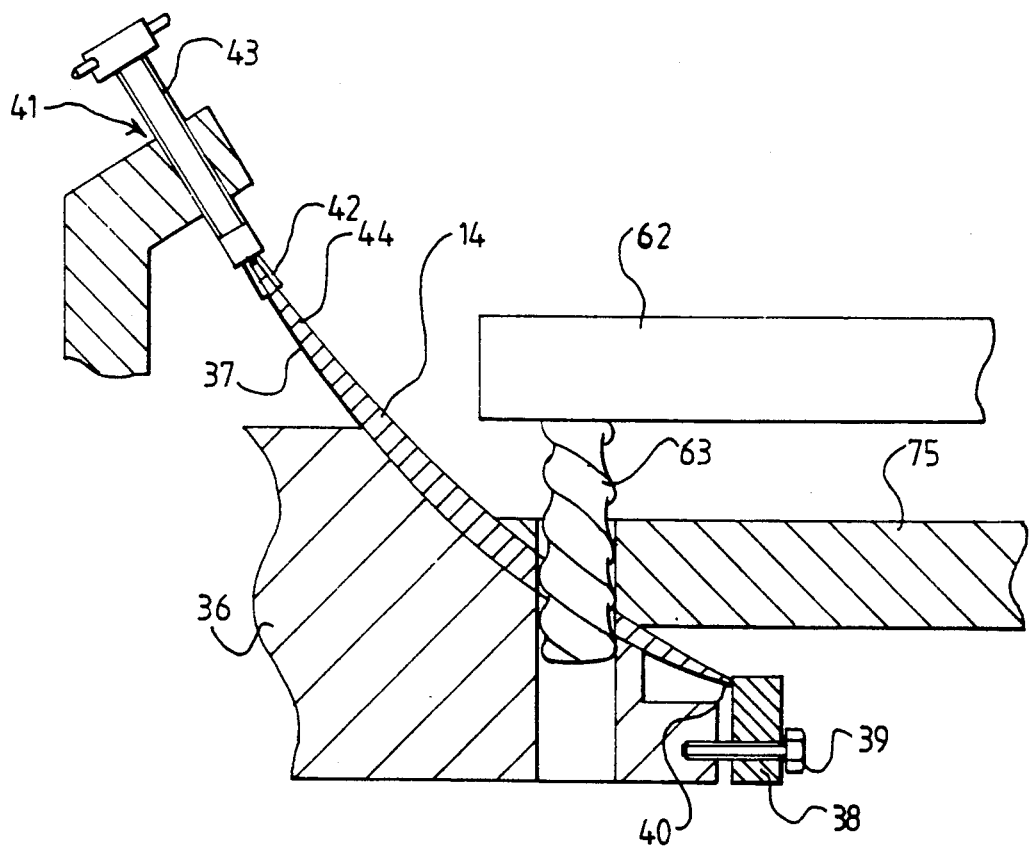
FIG. 3 is a sectional view of the machining apparatus shown in FIG. 1 with the machine bit having performed a machining operation.
Figure 6:
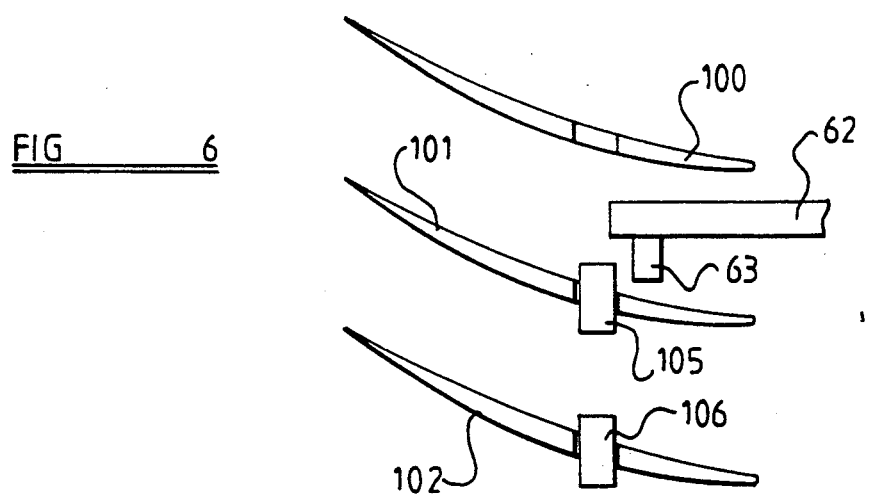

The stubs are then removed by the machining apparatus which may be of the form as shown in FIGS. 1 and 3 and for example, referring to FIG. 6, the blade 101 may be clamped by the supporting apparatus 26 and the machining apparatus is then moved in a direction substantially parallel to the rotor axis 27 until the machine bit 63 is moved in this first direction into contact with the lacing wire stub 105.

Figure 7:
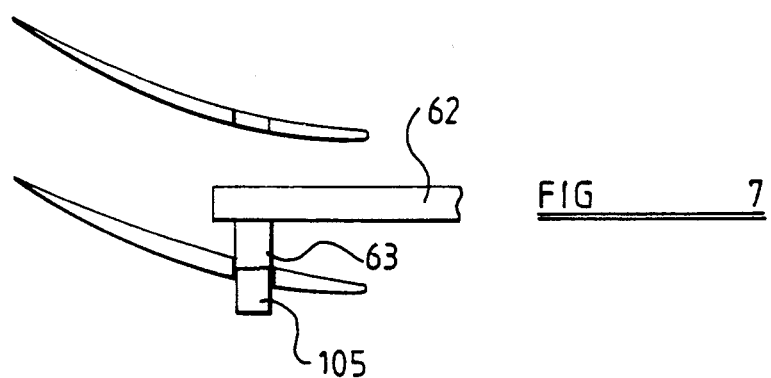

Movement of the machining apparatus then continues in the same direction until the machine bit 63 reaches the position as shown in FIG. 7 in which a "flat" has been formed on the top of the lacing wire stub 105.

Figure 8:
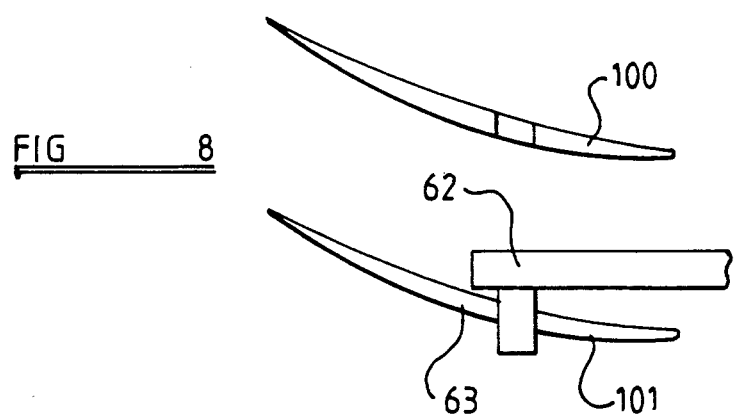
Figure 9:
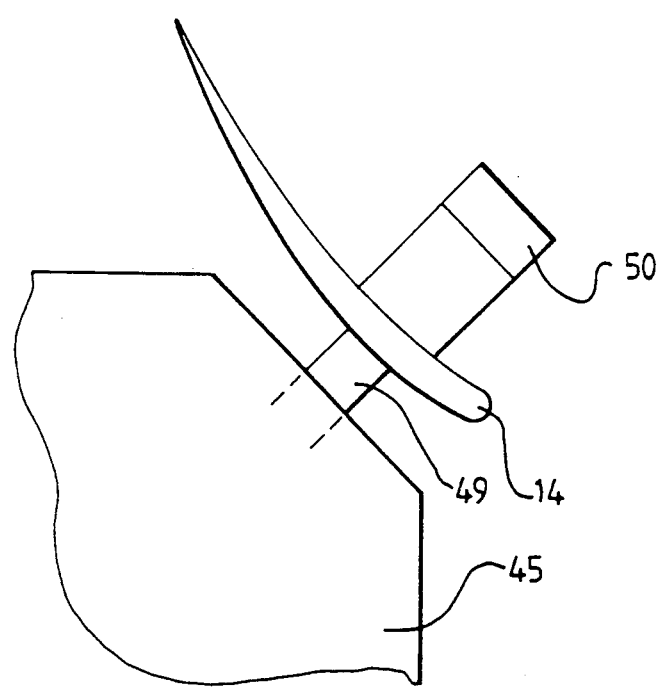
FIG. 9 is a sectional view of the further support member shown in FIG. 1.

The machining apparatus may then be moved in a downwards direction as shown in FIG. 8 and the stub 105 removed by machining.

It is envisaged that in some circumstances a different machine bit may be preferred to perform the machining operation shown completed in FIG. 7 and the drilling operation shown completed in FIG. 8. The machining apparatus may be withdrawn from its machining position and the bit replaced by a more suitable bit prior to recommencement of the drilling operation.

It is also envisaged that in some circumstances a similar sequence of events may be used to reform lacing wire holes in the blade, in the case where adjacent turbine blades are very close to each other movement in the first direction of the machine bit may cause contact with the blade and a "flat" may be formed on the blade by the machine bit so as to enable the machining apparatus to take up the correct aligned position to drill the lacing wire hole in the blade.

The features disclosed in the foregoing description, or the accompanying drawings, expressed in their specific forms or in the terms or means for performing the desired function, or a method or process for attaining the disclosed result, may, separately or in any combination of such features, be utilised for realising the invention in diverse forms thereof.

We claim:

1. Apparatus adapted to form a through bore or recess in a turbine blade, said apparatus comprisng a blade support apparatus adapted to support a turbine blade and a machining apparatus comprising a machine head having a machine bit mounted for rotary movement, said machine head being movable in a first direction to enable the machine bit to be brought into a predetermined machining position relative to the blade to be machined and also being movable in a second direction different from said first direction to enable the machine bit to be brought into contact with the blade and to enable the machining operation to be carried out to form said through bore or recess, said apparatus further comprising a blade engagement means adapted to engage a surface of the blade that is to be machined, said blade engagement means being mounted for movement with said machine head and being provided with an aperture, through bore or cut-out enabling the machine bit to pass therethrough to enable machining of the blade during movement of the machine bit in its second direction.

2. Apparatus according to claim 1 wherein said support apparatus comprises a first support part adapted to abut one face of a turbine blade, a second part adapted to engage the leading edge of the turbine blade and a third part adapted to engage the trailing edge of the turbine blade.

3. Apparatus according to claim 2 wherein said support apparatus comprises a fourth part adapted to engage the end of the turbine blade.

4. Apparatus according to claim 3 wherein said support apparatus is provided with movement means to adjust any of said first, second, third or fourth parts operation of said movement being such said parts may be moved to firmly clamp the turbine blade in a predetermined desired position.

5. Apparatus according to claim 4 wherein said turbine blade is secured to a rotor and said second movement means are provided to enable adjustment of said support apparatus in a direction substantially radially of an axis of revolution of the rotor.

6. Apparatus according to claim 1 wherein said support apparatus is provided with a base member or is adapted for mounting on a base member.

7. Apparatus according to claim 6 wherein said support apparatus is provided with movement means enabling movement of a part or parts adapted to support the blade relative to said base member.

8. Apparatus according to claim 1 wherein said turbine blade is secured to a rotor and said second direction is substantially tangential to an axis of revolution of said rotor.

9. Apparatus according to claim 1 wherein said turbine blade is secured to a rotor and said first direction is in a direction substantially parallel to an axis of revolution of the rotor.

10. Apparatus according to claim 1 wherein said turbine blade is secured to a rotor and said first direction is substantially radially of an axis of revolution of the rotor.

11. Apparatus according to claim 1 wherein said machining apparatus is provided with movement means to provide for movement in said first and second directions.

12. Apparatus according to claim 1 wherein said machine bit comprises a milling cutter.

13. Apparatus adapted to form a through bore or recess in a turbine blade of an array of blades, said apparatus comprising a blade support apparatus adapted to support a turbine blade and a machining apparatus comprising a machine head having a machine bit mounted for rotary movement, said machine head being movable in a first direction to enable the machine bit to be brought into a predetermined machining position relative to the blade to be machined and also being movable in a second direction different from said first direction to enable the machine bit to be brought into contact with the blade and to enable the machining operation to be carried out to form said through bore or recess, and means are provided to engage an adjacent blade in said array to bend, within an elastic limit, said blade to assist in making room for access of said machining apparatus to the blade requiring machining.

14. Apparatus according to claim 1 wherein said machining apparatus is provided with a base member or is adapted for mounting on a base member.

15. Apparatus according to claim 1 wherein said machine bit comprises a multi-fluted drill.

* * * * *